No. 612,204. Patented Oct. 11, 1898.
G. H. HUTTON & G. H. HUTTON, Jr.
TILTING DASHBOARD.
(Application filed Aug. 26, 1898.)
(No Model.)
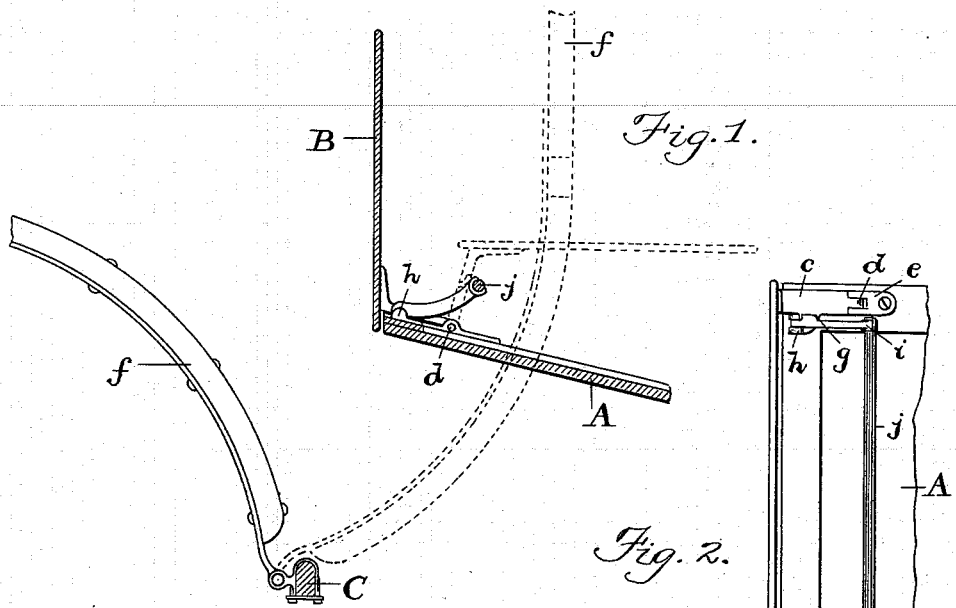
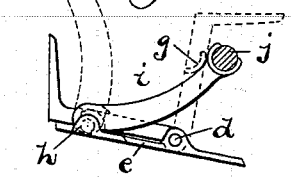
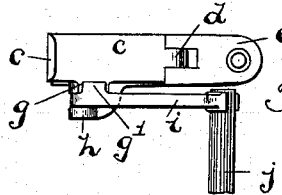
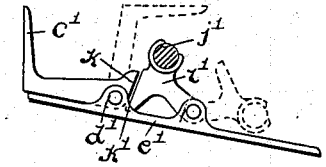
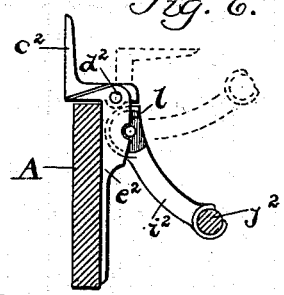
Witnesses:—
Lee J. Van Horn.
Chapin A. Ferguson.
Inventors
George H. Hutton
George H. Hutton Jr.
By
Chas. B. Mann
Attorney.
THE NORRIS PETERS CO., PHOTO-LITHO., WASHINGTON, D. C.

UNITED STATES PATENT OFFICE.

GEORGE H. HUTTON AND GEORGE H. HUTTON, JR., OF BALTIMORE, MARYLAND.

TILTING DASHBOARD.

SPECIFICATION forming part of Letters Patent No. 612,204, dated October 11, 1898.

Application filed August 26, 1898. Serial No. 689,559. (No model.)

*To all whom it may concern:*

Be it known that we, GEORGE H. HUTTON and GEORGE H. HUTTON, Jr., citizens of the United States, residing at Baltimore, in the State of Maryland, have invented certain new and useful Improvements in Tilting Dashboards, of which the following is a specification.

This invention relates to means for hinging dashboards to the bodies of vehicles.

The object of the invention is to provide means whereby the dashboard can be turned or thrown back to a rearward or inclined position to permit the shafts when elevated to pass the front end of the body and take substantially a vertical position in order that vehicles may be stored close and occupy a much less space than could otherwise be done.

The invention is illustrated in the accompanying drawings, in which—

Figure 1 is a sectional view of a dash and front part of the body of a vehicle with our improved construction, and also illustrates by broken lines the relative position of the dash and shafts when the dash is thrown back and the shafts are raised in a vertical position. Fig. 2 is a plan view of the front portion of the body of a vehicle, the dash, and foot-rail, and illustrates our invention. Fig. 3 is a side view of our improved dashboard-foot and a section of the foot-rail, and by broken lines shows the position taken when the dash is thrown back. Fig. 4 is a top plan view of same. Fig. 5 illustrates a modification. Fig. 6 shows another modification.

Referring to the drawings, the letter A designates the vehicle-body, B the dashboard, and C the axle.

The dashboard is connected to the body of the vehicle by two feet $c$ $c$, one at each side. These feet are hinged at $d$ to a base-plate $e$, which is bolted or secured to the vehicle-body. The dashboard member $c$ carries a laterally-projecting lug $g$, the purpose of which will presently be pointed out. The base-plate member $e$ has cast integral with it a lateral trunnion $h$. The foot-rail $j$ has two arms $i$ $i$, rigidly attached, one at each end, and each arm is pivoted to one of the trunnions $h$ and is free to raise and lower and carry the foot-rail $j$, on which the driver's feet rest. A lateral lug $g'$ also projects from each pivoted arm $i$, and when said arm is swung down, as shown in Figs. 1, 2, and 4, the lug $g'$ on the arm takes over the lug $g$ on the dashboard member $c$ and serves to hold the dash in its normal upright position. It will be seen that as the arms $i$ $i$ are fulcrumed at $h$ the weight of the foot-rail $j$, supported by the arms, will serve to hold the dashboard member $c$ in its normal position.

The operation is as follows: The foot-rail $j$ and arms $i$ are raised or turned up toward the dash far enough to disengage the lugs $g'$ on the arms from the lugs $g$ on the dashboard member $c$. The dash can then be tilted back to a rearward position and the foot-rail arms $i$ also tilted back (see Fig. 1) until the lug $g$ comes in contact with the pivoted arm $i$, (shown in Figs. 1 and 3,) which acts as a stop and prevents the dash from tilting farther back against the woodwork of the vehicle-body and bruising or scratching it. The shafts $f$ can then be raised to a vertical position, as shown in Fig. 1 by broken lines. It will be seen the weight of the foot-rail $j$ and arms $i$ $i$ serves to hold the dash firmly in an upright position.

Referring now to the modification shown in Fig. 5, the member $c'$, to which the dash is secured, is pivoted at $d'$ to base-plate member $e'$, which is secured to the vehicle-body, and an arm $i'$, which carries the foot-rail $j'$, is also pivoted to the base-plate. The dashboard member $c'$ has an angle-face $k$, which serves as a stop-shoulder for the tongue $k'$ on the arm $i'$ to abut against. The two positions the parts take in operation are clearly shown by full and broken lines and the operation is obvious. The weight of the foot-rail $j'$ and arm $i'$ serves to retain the dash in its upright position.

A further modification is shown in Fig. 6. Here the pivoted member $c^2$ secures the dash, and the member $e^2$ is bolted or secured to the vehicle-body A. The member $e^2$ at the top is slotted or grooved, and the member $c^2$ is pivoted at $d^2$, so as to work in said slot or groove. The arm $i^2$ is mounted in the bearing $l$, so as to be raised, as shown by dotted lines. The arm $i^2$ also carries the foot-rail $j^2$. By first raising the foot-rail the dash may be tilted from its upright to the backward position. The weight of the foot-rail $j^2$ and arm $i^2$ holds the dash upright.

Having thus described our invention, what we claim is—

1. The combination of a dash having hinges which connect it with the vehicle-body so as to permit the dash to tilt backward; and a movable foot-rail for the driver's feet which in one position serves to hold the dash upright and in the other position allows the dash to be tilted back.

2. In combination a dashboard hinged to the vehicle-body; a foot-rail having arms by which it is pivoted, and means connecting the foot-rail with the hinge, whereby pressure on the foot-rail will hold the dash in an upright locked position.

3. In a dashboard for vehicles the combination of a hinged connection between the dash and vehicle-body; and two arms pivoted to move up and down and carry a foot-rail and coacting with the said hinged connection, whereby the dash is held in its normal upright position.

4. In a dashboard for vehicles the combination of a hinge connecting the dash and vehicle-body and provided with a lateral lug; an arm pivoted to move up and down and also carrying a lateral lug, whereby when the dash is in its upright position the lug on the arm will contact with the lug on the dash-hinge and hold the dash in the normal upright position.

In testimony whereof we affix our signatures in the presence of two witnesses.

GEORGE H. HUTTON.
GEORGE H. HUTTON, JR.

Witnesses:
CHAPIN A. FERGUSON,
CHARLES B. MANN, Jr.